Patented Feb. 25, 1930

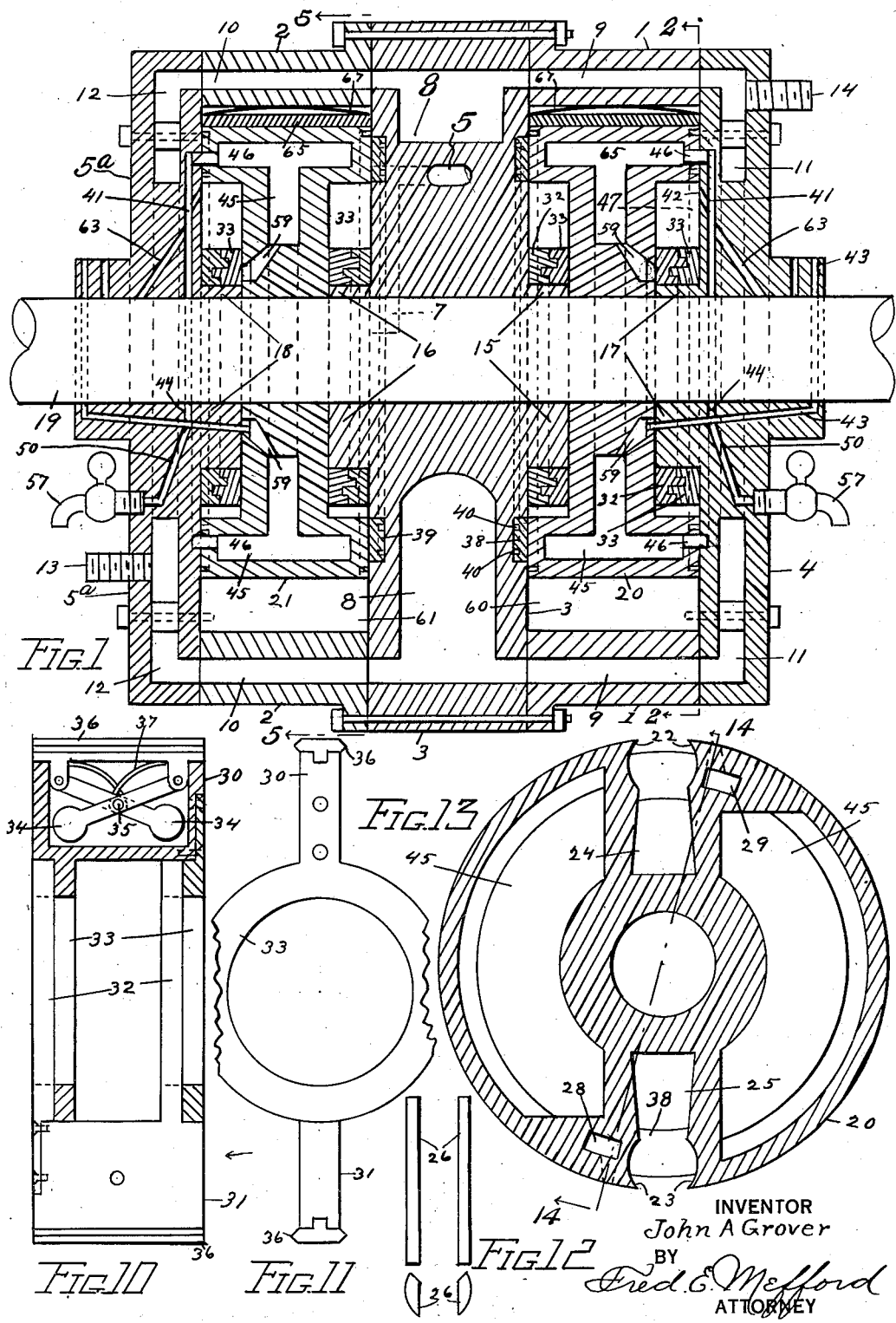

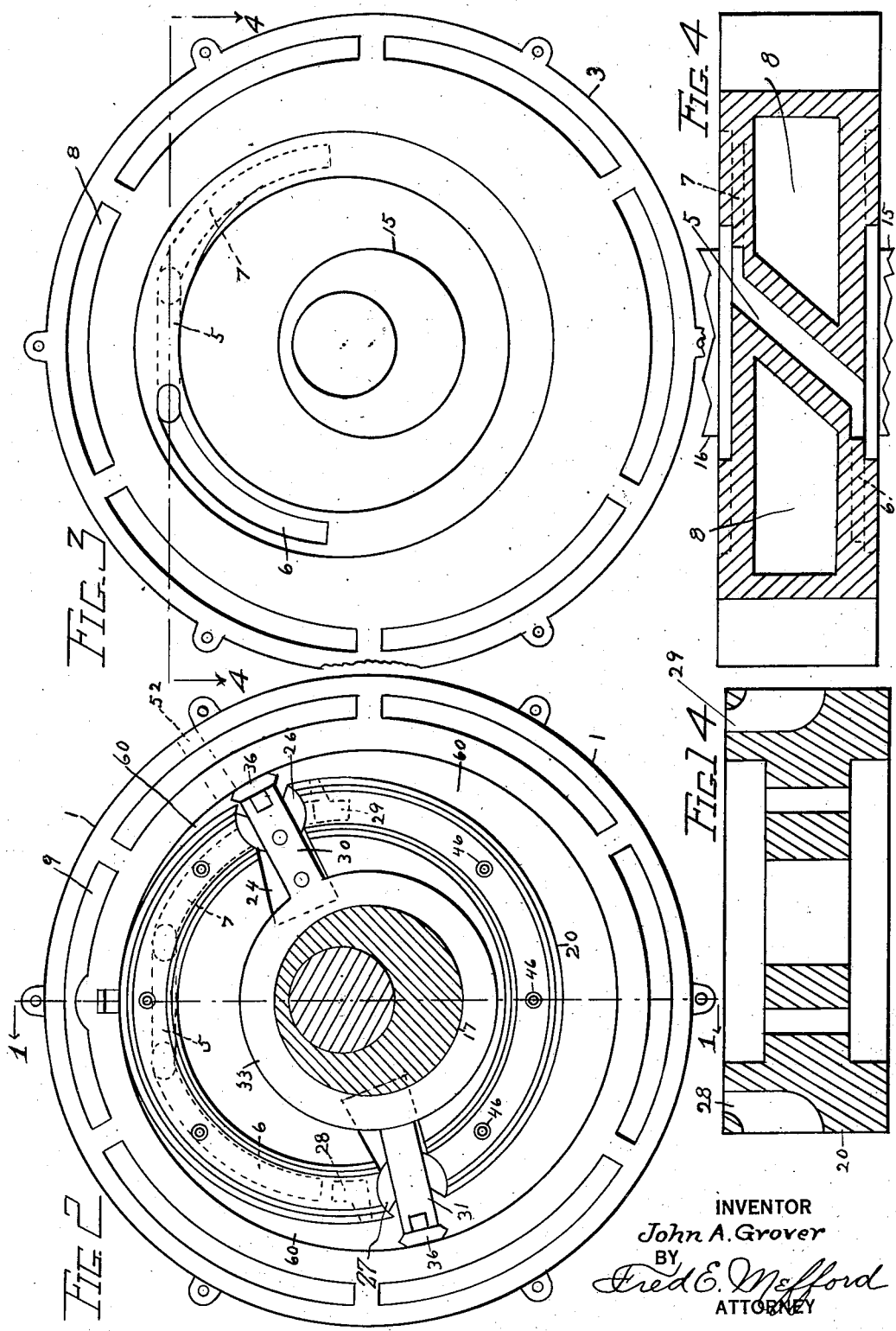

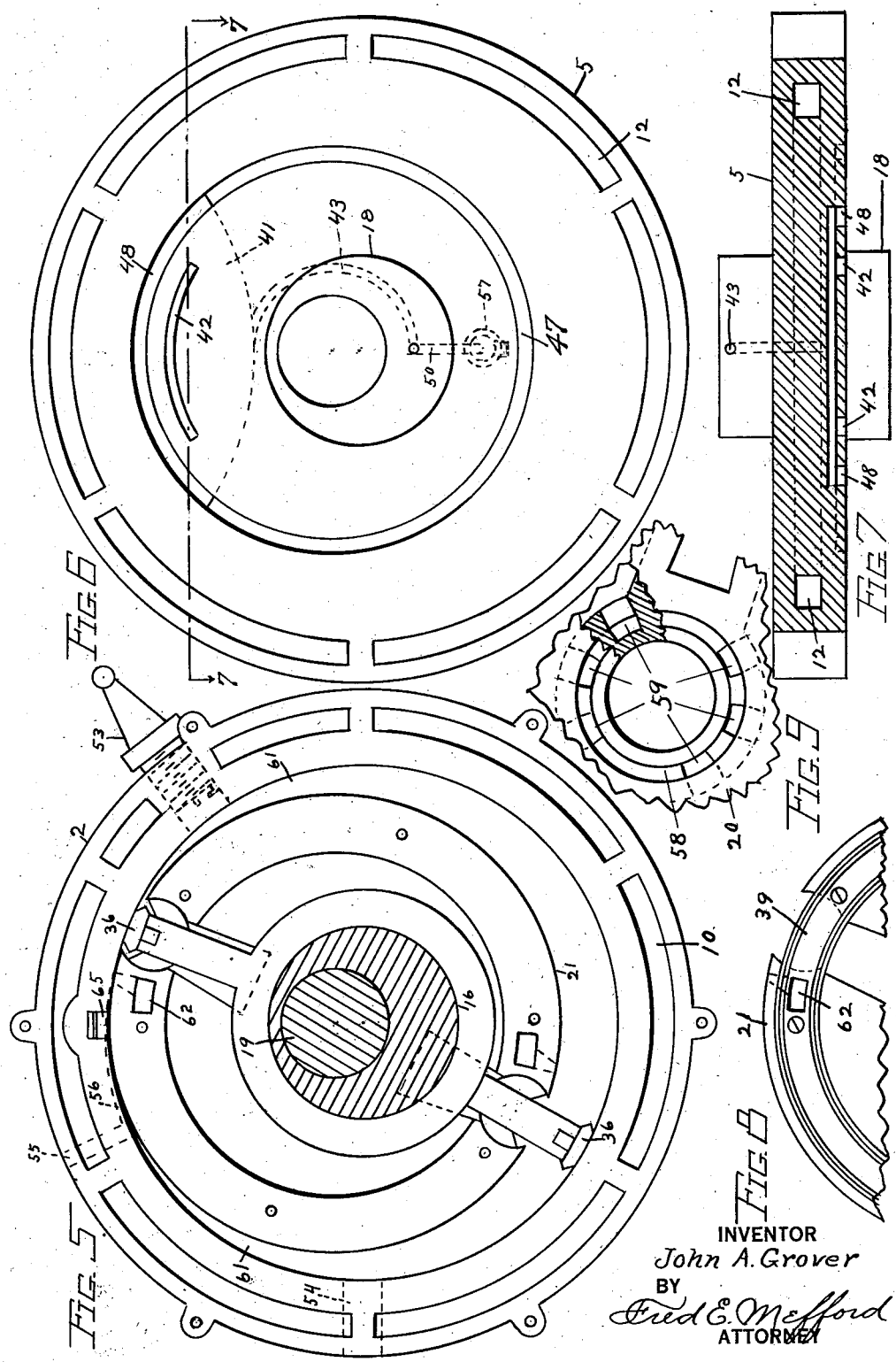

1,748,568

UNITED STATES PATENT OFFICE

JOHN A. GROVER, OF COLORADO SPRINGS, COLORADO

ROTARY INTERNAL-COMBUSTION ENGINE

Application filed April 7, 1927. Serial No. 181,733.

My invention relates to rotary internal combustion engines. My object is to provide an engine of this class having certain advantages and novel features, among which may be mentioned the following: The mixture is compressed in a compression chamber and delivered to the combustion chamber. By making the capacity of the compression chamber greater than that of the combustion chamber, said compression chamber becomes a super-charger. There are no movable valves, cams, pistons, connecting rods nor crank shafts. It can be run at a much higher speed and with less vibration than a reciprocating engine. It has two power impulses to each revolution of the drive shaft. It has means which prevent contamination of the oil by the gasoline or carbon. It has a perfect exhaust, therefore does not contaminate the next charge. Carbon can not collect in the combustion chamber. It has bearings which can be taken up from above instead of from underneath. Other objects will appear as the description progresses.

Figure 1 represents a vertical cross section of my engine taken on the line 1—1 in Fig. 2; Fig. 2, cross sectional elevation of the engine on the line 2—2 in Fig. 1; Fig. 3, a side elevation of the partition looking from the compression chamber side; Fig. 4, a sectional plan view of Fig. 3 on the line 4—4; Fig. 5, a vertical cross section of the engine on the line 5—5 in Fig. 1; Fig. 6, a side elevation of the side plate 5, looking from the combustion chamber side; Fig. 7, a sectional plan view of Fig. 6 on the line 7—7; Fig. 8, a fragmentary side elevation of the wheel 21; Fig. 9, a fragmentary elevation, partly in section, of the wheel 20 to show the annular groove 58 and the ports 59 leading into the oil chamber 45; Fig. 10, an elevation of a pair of vanes, one vane being in section; Fig. 11, a side elevation, partly broken away, of Fig. 10; Fig. 12, a plan and end elevation of a pair of segmental journals; Fig. 13, a vertical cross section of the wheel 20 looking towards the partition from the compression chamber and Fig. 14, a sectional elevation of wheel 20 on the line 14—14 in Fig. 13.

Although I show the preferred embodiment of my invention, I do not thereby limit myself to the precise form shown, but wish it understood that within the scope of what hereinafter is claimed, various changes in the details of construction may be made without departing from the spirit of the invention. The case comprises two cylindrical shells 1—2; a partition 3 and two side plates 4—5. The cylindrical shells 1—2 are bolted to the partition and the side plates 4—5ª are bolted to the cylindrical shells 1—2, respectively. A port 5 extends diagonally through the partition 3. A groove 6 in one side of the partition 3 communicates with one end of the port 5 and a groove 7 in the opposite side of the partition 3 communicates with the other end of the port 5. A water chamber 8 in the partition communicates with water chambers 9 and 10 in cylindrical shells 1 and 2, respectively. A water chamber 11 in side plate 4 is in open communication with water chamber 9 and a water chamber 12 in side plate 5 communicates with water chamber 10. An intake 13 enters water chamber 12 and an outlet 14 extends from water chamber 11. A fuel intake 52 is located in cylindrical shell 1. A spark plug 53, a main exhaust 54, a secondary exhaust 55, and a recess 56 are located in cylindrical shell 2. Two cylindrical bosses 15—16 extend concentrically from the sides of partition 3. A boss 17 on side plate 4 and a boss 18 on side plate 5 are disposed concentrically with bosses 15—16. A shaft 19 is journalled in side plates 4 and 5 the center of said shaft being off the center of the bosses. Wheels 20—21 are rigidly mounted on shaft 19. Wheel 20 is provided with two pairs of segmental bearings 22—23 in its rim and recesses 24—25. Segmental journals 26—27 are disposed in segmental bearings 22—23 respectively. Ports 28—29 in the rim of wheel 20 open through the periphery and side. Wheel 21 is provided with a pair of peripheral ports like ports 28—29 which communicate with groove 7. Hollow vanes 30—31 are slidably disposed between segmental journals 26—27 respectively and are provided with ring portions 32—33 which are rotatably mounted on bosses 15—17. A pair of weighted cross arms 34 are pivoted in each hollow vane by pivot 35. A shoe 36 is mounted in the end of each hollow vane and loosely connected to a pair of said weighted cross arms. A spring 37 is connected to each pivot 35 and the free ends disposed against the shoe 36. The ring portions of each pair of vanes are annularly ribbed and grooved and disposed so that the ribs of one fit into the grooves of the adjacent ring portions as shown in Fig. 1. Rings 38—39 are secured to wheels 20—21, respectively, and run in annular grooves in the sides of partition 3. These rings are provided with packing ring 40. A slot 42 in each side plate communicates with the adjacent oil reservoir 41. A supply duct 43 is in communication with oil reservoir 41 via drain duct 44 and with the interior of the case. An oil chamber 45 in each wheel is provided with a plurality of tubes 46 which run in an annular groove 47 in the adjacent side plate. The groove 47 communicates with oil reservoir 41 via a slot 48. A drain duct 50 in each side plate leads from supply duct 43 to a cock 57. The supply duct 43 extends into an annular groove 58 in each wheel. The annular groove 58 communicates with the oil chamber within the wheel via ports 59. The drawings show the vanes in the proper positions to commence a round of operations which will now be described.

As shaft 19 revolves clockwise (Fig. 2), vane 30 sucks the mixture through intake 52 and into the compression chamber 60. The vane 31 follows and passes intake 52 thereby closing the mixture in compression chamber 60. As vane 31 continues it compresses the mixture until port 28 in wheel 20 communicates with groove 6 in the partition 3. During the time port 28 is in communication with groove 6, the compressed charge passes through port 28, groove 6, port 5, groove 7, and is delivered to the combustion chamber 61 via a peripheral port in wheel 21, (Fig. 5) where it is ignited by the spark plug 53 and exhausted through main exhaust 54. These operations take place during one half of the revolution of the shaft 19. A similar set of operations take place during the remaining half of the revolution when port 29 comes into communication with groove 6. Therefore there are two power impulses to each revolution of the shaft 19. If any gases of combustion fail to exhaust through main exhaust 54, they may escape through secondary exhaust 55. If any gases pass by secondary exhaust 55 they will collect in recess 56 and permit the vanes to pass over them, thereby eliminating any back pressure. Oil from supply duct 43 enters annular groove 58 and is conveyed to oil chamber 45 via ports 59. When the wheel is revolved, the oil in chamber 45 is thrown to the outer wall of the chamber 45 and escapes through tubes 46 into oil reservoir 41 as said tubes are passing over slot 48. If any oil escapes from annular groove 58 outside the wheel, it will be thrown to the inside of the rim of the wheel and pass through slot 42 into oil reservoir 41. Oil duct 63 conveys oil from reservoir 41 to the shaft 19. The water chambers are connected to a radiator in the regular manner. Since each wheel rotates about the center of the shaft 19 and the vanes rotate about the center of the bosses, the segmental journals slide radially on the vanes and rotate slightly in the segmental bearings. The top of each wheel runs against the adjacent cylindrical wall. A packing bar 65 is disposed adjacent to each wheel and held against said wheel by a spring 67. While the engine is running centrifugal force holds the shoes tightly against the adjacent cylindrical wall. To counter balance this action, the weighted cross arms are provided. The weights on each pair of cross arms equal the weight of the shoe to which said cross arms are connected. The centrifugal force due to the weights causes the cross arms to exert a pull inward on the shoes.

I claim:

In a rotary internal combustion engine, the combination of a case having a circular interior; a solid shaft journalled in said case eccentric therewith; a partition in said case dividing the interior into a pair of concentric circular compartments, said partition containing a diagonal port therethrough and a curved groove in each side communicating with said diagonal port, said grooves being disposed so as to conform to arcs of circles concentric with said solid shaft; a circular wheel rigidly mounted on said solid shaft in each compartment, each wheel containing two diametrically opposed peripheral ports entering the periphery and emerging from the side adjacent to said partition and adapted to communicate intermittently with said curved grooves, the communication of a peripheral port with a groove in one compartment being simultaneous with the communication of a peripheral port and curved groove in the other compartment; and a pair of vanes slidably disposed in each circular wheel adjacent to said peripheral ports and journalled concentrically with said circular compartments, the vanes in the compression chamber being disposed behind the peripheral ports and the vanes in the combustion chamber, in advance of the peripheral ports relative to the direction of travel.

JOHN A. GROVER.